(12) United States Patent
Lyons

(10) Patent No.: US 6,270,302 B1
(45) Date of Patent: Aug. 7, 2001

(54) FASTENER IDENTIFICATION SYSTEM

(76) Inventor: Antony C. Lyons, 24917 W. Christine Dr. #1, Splendora, TX (US) 77372

( * ) Notice: Subject to any disclaimer, the term of this patent is extended or adjusted under 35 U.S.C. 154(b) by 0 days.

(21) Appl. No.: 09/419,580

(22) Filed: Oct. 18, 1999

(51) Int. Cl.$^7$ ................................................. F16B 31/02
(52) U.S. Cl. .............................. 411/8; 411/13; 411/121; 411/DIG. 2
(58) Field of Search .................... 411/429, 377, 411/373, 372.5, 372.6, 121, 119, 14, 8, 525, 526, DIG. 2, 13; 116/200, 201, 208, DIG. 1, 206, 207; 374/162, 141, 142, 208

(56) References Cited

U.S. PATENT DOCUMENTS

| | | | |
|---|---|---|---|
| 3,877,411 | * | 4/1975 | MacDonald . |
| 4,070,912 | * | 1/1978 | McNaughtan . |
| 4,906,150 | * | 3/1990 | Bennett ................................. 411/119 |
| 4,930,951 | * | 6/1990 | Gilliam .................................. 411/14 |

FOREIGN PATENT DOCUMENTS

| | | | |
|---|---|---|---|
| 460595 | * | 5/1928 | (DE) ..................................... 411/121 |
| 2242720 | * | 10/1991 | (GB) ..................................... 411/41 |

* cited by examiner

*Primary Examiner*—Flemming Saether
(74) *Attorney, Agent, or Firm*—Gregory M. Luck; Sankey & Luck, L.L.

(57) ABSTRACT

A system to allow a visual determination of the rotational position of a rotatable object relative to a stationary object comprising a body defining front and back surfaces where the body includes at least one aperture having a diameter $d_1$ disposed through the front and back surfaces, where the aperture is bounded by radial slots having a length $l$ and extending outwardly from the aperture so as to define a plurality of fingers which may be independently manipulated so as to enable the body to be biased about a rotatable object inserted through the aperture and means co-operable with the body to allow a visual determination of the rotational position of the rotatable object relative to the stationary object.

14 Claims, 6 Drawing Sheets

FIG. 4A     FIG. 4B

FASTENER IDENTIFICATION SYSTEM

BACKGROUND OF THE INVENTION

1. Field of the Invention

The present invention relates generally to automobile safety systems. More significantly, the present invention relates to a system to allow visual identification of the proper tightness of a fastener.

2. Description of the Prior Art

It is oftentimes necessary in mechanical and industrial environments to have the ability to ascertain whether a given fastener is sufficiently tightened to desired specifications. In this connection, it is necessary to periodically check the tightness of bolts in factories, refineries and processing plants to ensure optimal equipment performance. This need for periodic inspection is a result of vibration common to such environments which may and do cause fasteners to back off over time.

In the automotive environment, drivers of semi-trailers also must periodically check the tightness of wheel lugs to prevent catastrophic accidents. Such a procedure is many times required by insurance carriers and has recently been required by ordinance or otherwise in various countries.

Notwithstanding the insurance and statutory requirements, it is frequently inconvenient to undertake periodic inspection of the fasteners. In this connection, in many industrial applications, the fasteners are used in environments which are hazardous to access due to thermal or chemical constraints. In the automotive application, environmental conditions often render it less than convenient to ensure adequate and proper tightness on all wheels.

One solution proposed to address the above need was prepared in Great Britain Patent Nos. 2,242,720 and 2,325,505 as issued to Marczynski et al. Marczynski employed a system whereby a series of plastic markers were mounted over the top of truck lug bolts so as to form a recognizable pattern. In such a fashion, the truck driver could visually ascertain the current tightness of a given wheel by merely observing the pattern of the markers.

The aforementioned solution presents a number of disadvantages. The first such disadvantage is that the plastic indicators are prone to be dislodged due to the way in which they mount on the lug nut.

A second disadvantage is that the mounting system for the indicators makes them prone to tampering or removal by unauthorized persons since they usually require no more pressure to remove than to affix in the first instance. Yet another disadvantage is that the indicators, due to their construction, are prone to failure in vigorous thermal environments.

SUMMARY OF THE INVENTION

The present invention addresses the above and other disadvantages of prior art fastener identification systems for use in industrial and automotive environments.

In one embodiment, the present invention comprises a generally planar body through which is disposed a circular aperture sized somewhat smaller than the fastener to which it is designed to be attached. The body includes a number of radial slots disposed about the inner diameter of the aperture. These slots define a series of radial fingers which may be independently flexed in an inward or outward direction. In such a fashion, when the system is mounted over a given fastener, the radial finger contacting the edges of the fastener will flex upwardly and bias against the fastener. In such a fashion, the system is mounted on the fastener in a secure fashion.

The present invention presents a number of advantages over prior art systems. One advantage is that it may be secured to the fastener such that it may not be removed except upon removal of the fastener. In such a fashion, tampering may be substantially reduced since the force required to remove the body from the fastener is much greater than that to affix the body in the first instance.

BRIEF DESCRIPTION OF THE DRAWINGS

FIGS. 4A–B are top views of alternate embodiments of the invention.

DETAILED DESCRIPTION OF THE PREFERRED EMBODIMENTS

Figure 4C:
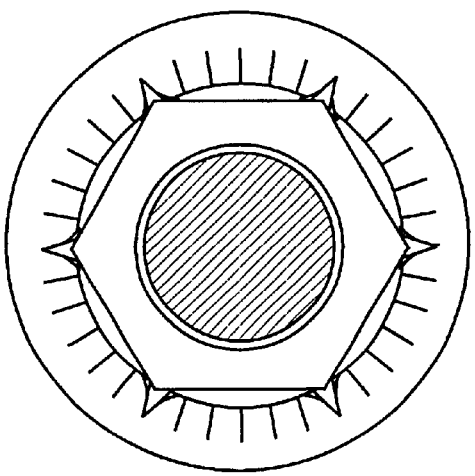
FIG. 4C is a top view of a prior art embodiment.
Figure 4C:
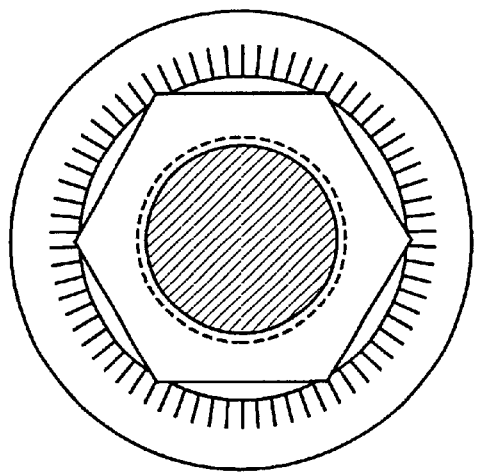
Figure 4C:
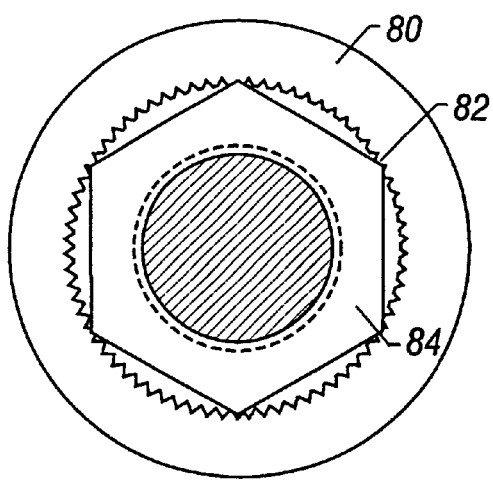

FIG. 4C illustrated a top view of one prior art embodiment 70 which includes a body 80 on which are disposed a number of teeth 82 adapted to generally match the external profile of a given fastener 84. In this type of embodiment, no biasing force is applied against said fastener 84 since the inner diameter d of body 80 is roughly the same size as the outer diameter of fastener 84. In this embodiment, and for reasons obvious to those skilled in the art, the pressure to affix and remove body 80 is substantially the same.

Figure 1:
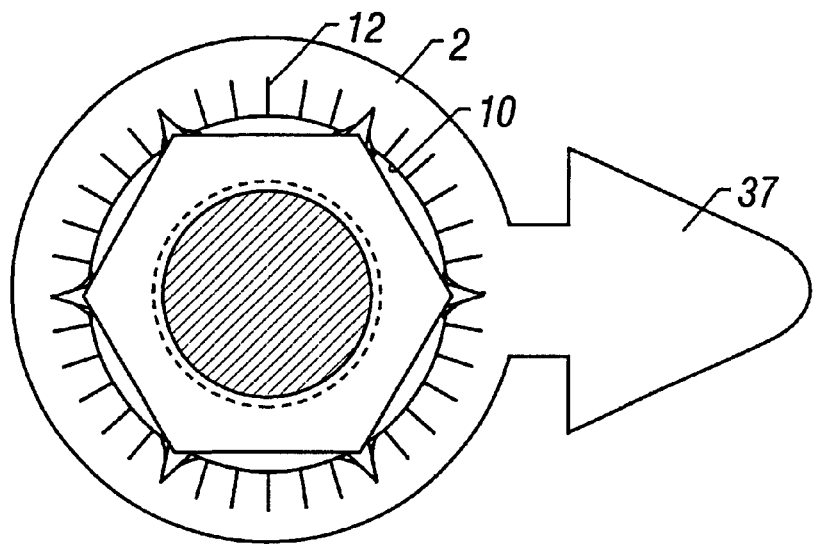
FIG. 1 is a front view of one embodiment of the invention.
Figure 2:
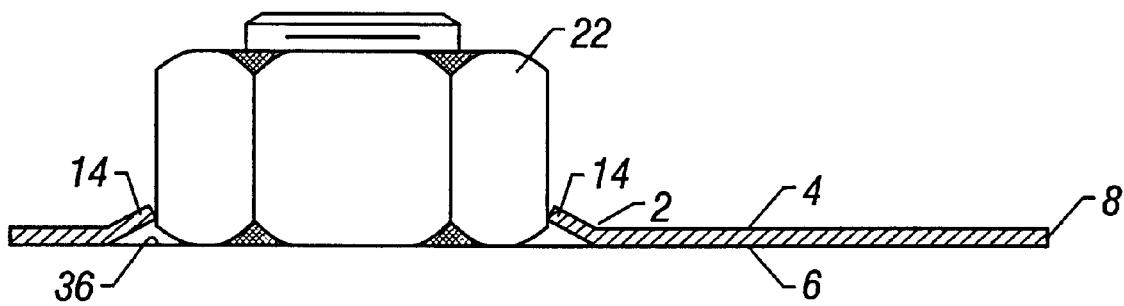
FIG. 2 is a side view of the embodiment illustrated in FIG. 1.
Figure 3:
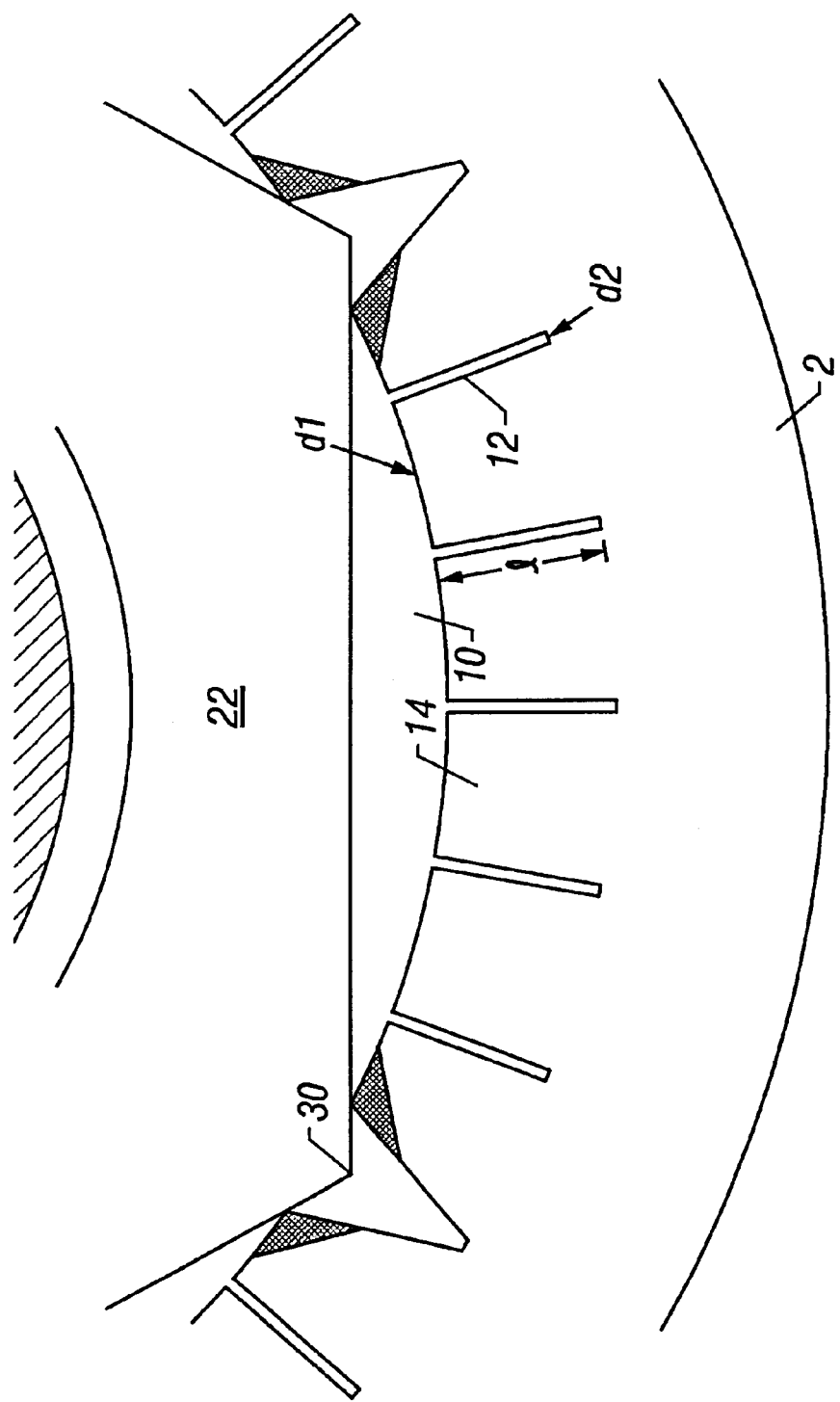
FIG. 3 is a top detail view of the embodiment illustrated in FIG. 1.

One preferred embodiment of the present invention 1 may be seen by reference to FIGS. 1–3. As illustrated, the invention 1 comprises a body 2 which defines front 4, back 6 and side surfaces 8. In a preferred embodiment, body 2 is substantially planar in configuration, although other configurations are also envisioned within the spirit of the invention. For example, it may be desirable for the body to include a cap (not shown) to prevent dust and other contaminants from a given fastener.

Body 2 includes an aperture 10 which is disposed through front and back surfaces 4 and 6, as illustrated. This aperture 10 defines a first diameter $d_1$. In a preferred embodiment, aperture 10 is substantially round, though other configurations, e.g. octagonal, are also envisioned within the spirit of the invention depending on the intended fastener for which use is intended.

A series of slots 12 are formed in body 2 in a generally circular area immediately bounding aperture 10. In such a fashion, at least one end of each slit 12 terminates in aperture 10 where the other end of slit 12 defines a second diameter $d_2$. Slots are preferably equidimensional and regularly spaced so as to form tongues or arms 14 having a length "l." In a preferred embodiment, it has been discovered that the ideal angle for deflection of arms 14 to achieve a maximum biasing force is between 25°–35° as measured from the plane defining body 2. Moreover, the larger the slot the less biasing force achievable depending given a similar material of consistent thickness.

In application, body 2 is adapted to be used with a fastener 22, e.g. a lug nut, slightly larger in diameter than aperture 10 but not larger than d+(½1). By reference to the figures, body 2 is placed over and aligned with fastener 22 in the manner illustrated in FIGS. 2 and 3. Pressure is then applied to body 2 in a direction substantially parallel to the axis defined by fastener 22 so as to deform those fingers 14 which contact the largest diametric extent of said fastener 22. In the instance of a lug nut, the largest diameter would include edges 30. Pressure on body 2 is continued until body 2 has been moved completely to the base 36 of fastener 22 (see FIG. 2). In this position, fingers 14 are deformed about said fastener but are maintained in contacting relation so as to prevent the ready removal of said body 2 from said fastener 22.

In a preferred embodiment, body 2 is comprised of a resilient material which includes a material memory sufficient to exert a biasing force against fastener 22. One such material could be spring steel, though other materials, e.g. nylon, are also envisioned within the spirit of the invention.

In a preferred embodiment, body 2 is provided with at least one elongate protrusion 37 which may take a variety of shapes depending on the intended application. Protrusion 37 allows a ready visual determination to be made of the rotational position of body 2 when it is affixed about a given fastener 22. Protrusion 37 may be formed integrally with body 2 or may be coupled to body 2 in a conventional manner familiar to those skilled in the art.

Figure 5:
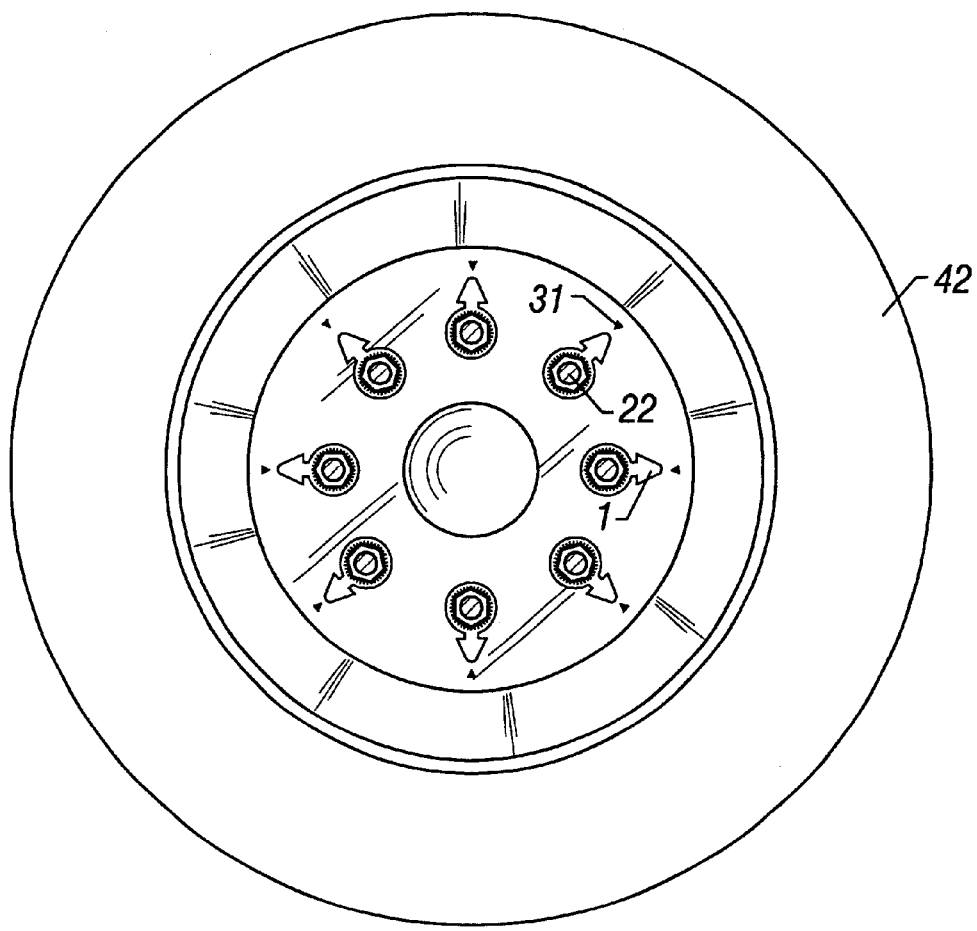
FIG. 5 is a top view of one embodiment of the present invention as it may be applied to wheel fasteners.
Figure 6:
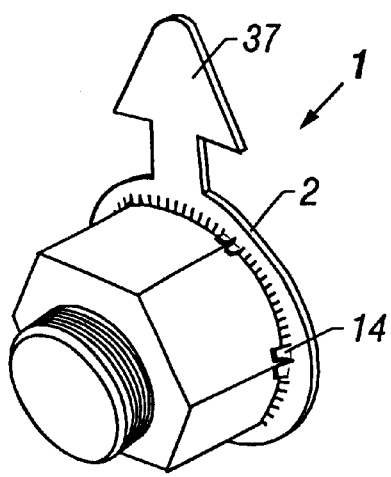
FIG. 6 is a perspective view of one embodiment of the invention.

The present invention has application to a variety of uses. One of the most familiar is its use in connection with the lug nuts on a commercial vehicle. Once lug nuts are properly tightened, one of the indicators of the invention is affixed over each said nut to define a pattern such as that illustrated in FIG. 5. Alternately, the indicators are placed on the bolt and an indication mark 31 is scored on the wheel 42. Still alternately, the indicators may be affixed where they are aligned in pairs. The result for each example is the same. When any one of the lug nuts begins to loosen, the protrusions 37 begin to deviate from the prescribed pattern so as to become immediately obvious to observation, and thus may be re-tightened.

Figure 7:
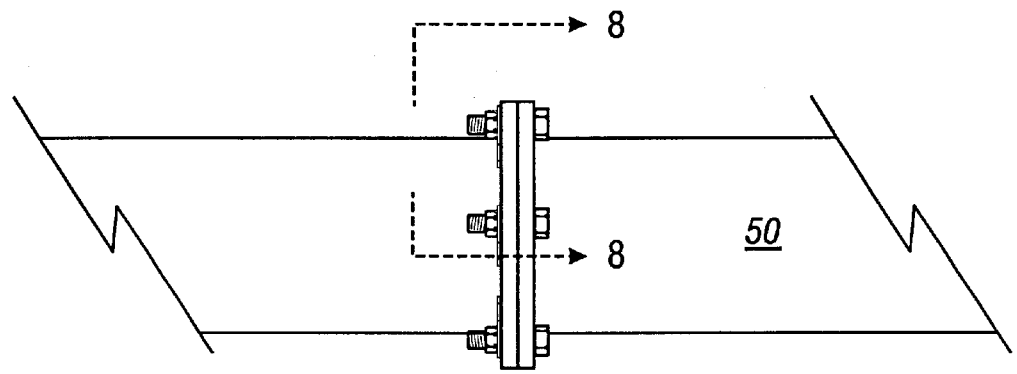
FIG. 7 is a side view of one embodiment of the invention as it may be applied to a valve housing.
Figure 8:
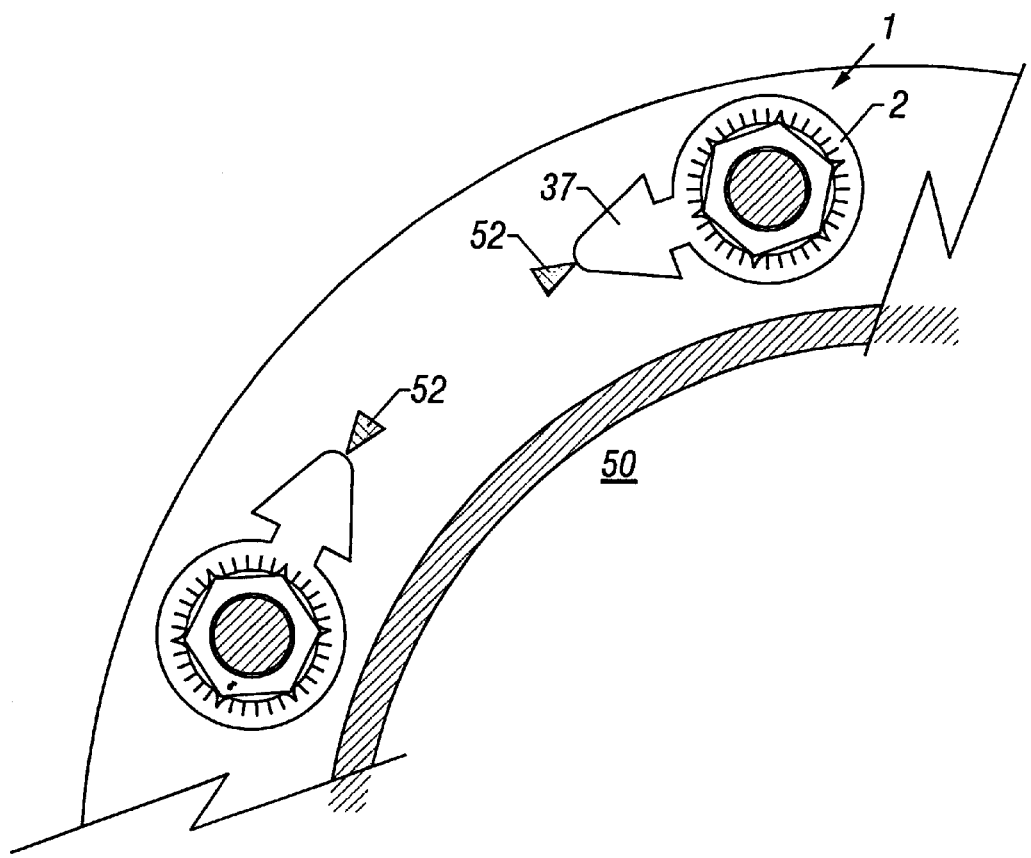
FIG. 8 is a top view of the embodiment illustrated in FIG. 7.
Figure 9:
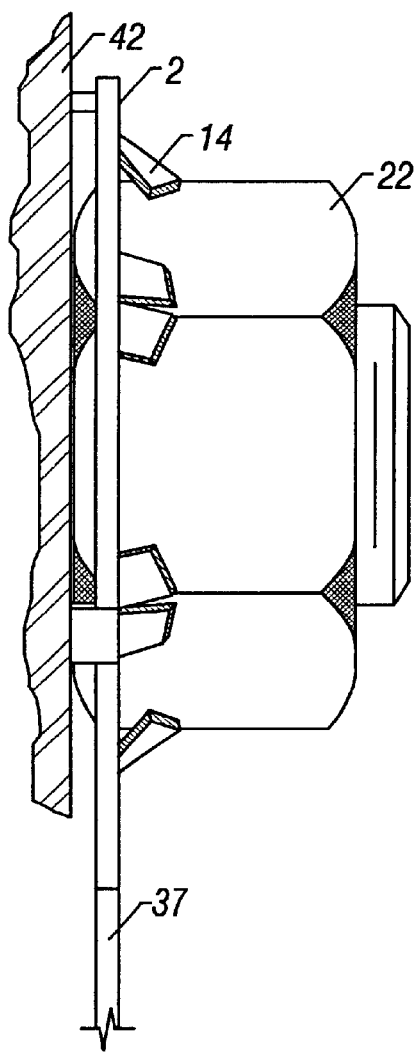
FIG. 9 is a detail view of the embodiment illustrated in FIG. 3.
Figure 10:
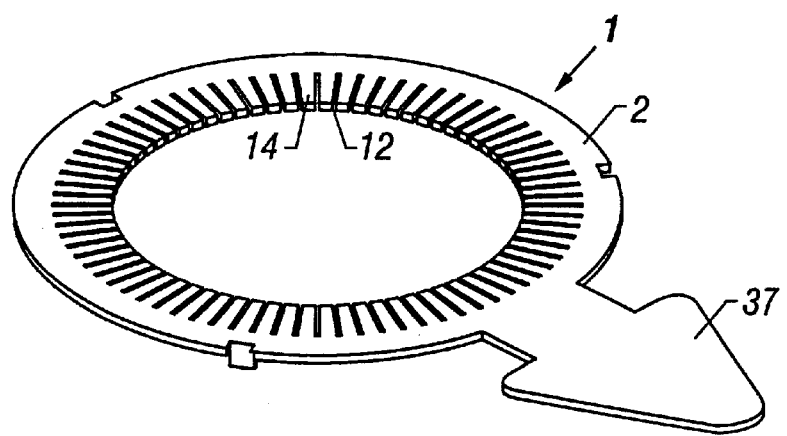
FIG. 10 is a perspective view of one embodiment of the invention.

The system may also be used in connection with any industrial application subject to vibrational forces. For example, in a refinery the device may be used on valves 50 and connectors so as to identify whether about a given bolt position falls between indicated marks 52 which may be scored or painted on the valve. (See FIGS. 7–8). In such a fashion, the movement or loosening of any of these bolts may be readily detectable.

The system of the present invention also has use to identify dramatic changes in temperature which may indicate a problem. For example, in industrial applications an increase or decrease in temperature may coincide with a loss of pressure and therefore suggest a leak or blockage. In the automotive applications, an increase in wheel temperature is often indicative of a brake or bearing problem.

To identify these variations in temperature, the body may be coated with a thermally sensitive paint or other coating which alters hues and/or colors at temperatures above or below a given range. In such a fashion, the transformation of a normally white wheel indicator to black would suggest abnormal heating of the wheel and a potential failure of the braking system.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A system to allow a visual determination of the rotational position of a rotatable object relative to a stationary object comprising:

a body defining front and back surfaces where said body includes at least one aperture having a diameter $d_1$ disposed through said front and back surfaces where said aperture is sized to fit about said rotatable object said body including a temperature sensitive coating which changes from a first to a second color when exposed to temperatures beyond a predetermined value;

said aperture bounded by radial slots having a length l and extending outwardly in from said aperture so as to define a plurality of fingers which may be independently manipulated so as to enable said body to be biased about a rotatable object inserted through said aperture where each of said slots defines substantially parallel sides to said fingers over said length l; and means co-operable with said body to allow a visual determination of the rotational position of said rotatable object relative to the stationary object.

2. The system of claim 1 where the visual determination means includes an elongate extension of said body extending along at least one axis parallel to the front surface of the body.

3. The system of claim 1 where the body is manufactured from a resilient material.

4. The system of claim 1 where the body is manufactured from spring steel.

5. The system of claim 1 where the aperture is substantially round.

6. The system of claim 1 where the aperture is slightly smaller in diameter than the largest diameter portion of the rotatable object.

7. The system of claim 1 where the length "l" of the slots is determined so as to enable a deflection angle of said fingers about said rotatable object in the range of 25°–35° as measured from a plane parallel to the front and back surfaces.

8. The system of claim 1 where said slots each include a terminal end which collectively define a second diameter $d_2$ where the diameter of the rotatable object is less than $d_1+(½1)$.

9. A device for indicating relative rotational displacement between a fixed first member and a second member, said device comprising:

a body defining a bore therethrough to accommodate said second member;

said bore defining a series of slits extending to a second diameter so as to define a series of fingers where said fingers are adapted to deform to accommodate the through passage of said second member where each of said fingers is substantially parallel to each adjacent finger said body further including a temperature sensitive coating which changes from a first to a second color when exposed to temperatures beyond a predetermined value; and indicating means to indicate the position of the device relative to a reference.

10. The device of claim 9 where said body defines a front and back surface, where said back surface is adapted to contact said first member.

11. The device of claim 9 where said body and said indicating means are formed integrally.

12. The device of claim 9 where the indicating means comprises an elongate protrusion of said body.

13. The device of claim 9 where said body is formed from a resilient material such that deformation of said fingers results in a biasing force asserted against said second member.

14. The device of claim 9 further including a thermally sensitive coating which is adapted to change colors at above or below a given temperature range.

* * * * *